（12）United States Patent
Uchida

(10) Patent No.: US 9,307,136 B2
(45) Date of Patent: Apr. 5, 2016

(54) IMAGING APPARATUS AND METHOD WHERE AN OUTPUT OF DATA INDICATING A RESULT OF A CORRELATION CALCULATION IS INTERMITTENTLY PERFORMED

(71) Applicant: CANON KABUSHIKI KAISHA, Tokyo (JP)

(72) Inventor: Mineo Uchida, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/211,571

(22) Filed: Mar. 14, 2014

(65) Prior Publication Data

US 2014/0285705 A1    Sep. 25, 2014

(30) Foreign Application Priority Data

Mar. 19, 2013    (JP) .................................. 2013-055926

(51) Int. Cl.
*H04N 5/232* (2006.01)

(52) U.S. Cl.
CPC ................................ *H04N 5/23212* (2013.01)

(58) Field of Classification Search
CPC .............................. G02B 7/34; H04N 5/23212
See application file for complete search history.

(56) References Cited

U.S. PATENT DOCUMENTS

| 6,933,978 | B1 * | 8/2005 | Suda | 348/345 |
|---|---|---|---|---|
| 8,018,524 | B2 * | 9/2011 | Kawarada | 348/350 |
| 8,525,917 | B2 * | 9/2013 | Taniguchi | 348/345 |
| 8,854,510 | B2 * | 10/2014 | Nagata | 348/247 |
| 8,854,529 | B2 * | 10/2014 | Yoshimura et al. | 348/345 |
| 8,970,773 | B2 * | 3/2015 | Nagano | 348/350 |
| 9,048,152 | B2 * | 6/2015 | Kishi | |
| 2004/0207747 | A1 * | 10/2004 | Ikeda | 348/335 |
| 2008/0024646 | A1 * | 1/2008 | Bloom et al. | 348/345 |
| 2009/0115882 | A1 * | 5/2009 | Kawarada | 348/340 |

(Continued)

FOREIGN PATENT DOCUMENTS

| JP | 2001-124984 A | 5/2001 |
|---|---|---|
| JP | 2010-185998 A | 8/2010 |

(Continued)

OTHER PUBLICATIONS

U.S. Appl. No. 14/211,614, filed Mar. 14, 2014.

(Continued)

*Primary Examiner* — Nicholas Giles
(74) *Attorney, Agent, or Firm* — Fitzpatrick, Cella, Harper & Scinto

(57) ABSTRACT

An imaging apparatus includes an imaging element for outputting focus detecting signals. A DFE performs phase difference detection-type focus detecting calculation using an output signal of the imaging element. A CPU controls a focus drive circuit depending on the result of calculation and a focus lens is driven so as to perform a focus adjusting operation. The CPU controls the DFE to intermittently execute focus detecting calculation at a predetermined frequency set for a plurality of image frames. In the first mode, AF processing is executed at a rate of once in a few frames and the operation of a circuit unit for performing correlation calculation or the like is stopped in a frame period during which no focus detecting calculation is performed, whereas in the second mode, AF processing is executed for each frame so as to perform a focus adjusting operation following the movement of an object.

26 Claims, 10 Drawing Sheets

(56) References Cited

U.S. PATENT DOCUMENTS

| | | | |
|---|---|---|---|
| 2009/0256952 A1* | 10/2009 | Kusaka | 348/349 |
| 2010/0165176 A1* | 7/2010 | Taniguchi | 348/345 |
| 2011/0043678 A1* | 2/2011 | Ueda et al. | 348/345 |
| 2011/0044682 A1* | 2/2011 | Kawanami | 396/439 |
| 2011/0085786 A1* | 4/2011 | Tamaki | 396/104 |
| 2012/0212654 A1* | 8/2012 | Nagata | 348/247 |
| 2013/0076970 A1* | 3/2013 | Kishi | 348/349 |
| 2013/0107086 A1* | 5/2013 | Nagano | 348/273 |
| 2013/0147998 A1* | 6/2013 | Yoshimura et al. | 348/302 |
| 2013/0250154 A1 | 9/2013 | Hirose et al. | |
| 2014/0055642 A1* | 2/2014 | Uchida | 348/231.99 |
| 2014/0284449 A1* | 9/2014 | Uchida | 250/201.2 |
| 2014/0368696 A1* | 12/2014 | Uchida | 348/234 |

FOREIGN PATENT DOCUMENTS

| | | |
|---|---|---|
| JP | 2010-237400 A | 10/2010 |
| JP | 2012-163923 A | 8/2012 |

OTHER PUBLICATIONS

Office Action dated Jul. 14, 2015, in Japanese Patent Application No. 2013-055926.

* cited by examiner

OUT-OF-FOCUS STATE

SUBSTANTIALLY FOCUSED STATE

IMAGING APPARATUS AND METHOD WHERE AN OUTPUT OF DATA INDICATING A RESULT OF A CORRELATION CALCULATION IS INTERMITTENTLY PERFORMED

BACKGROUND OF THE INVENTION

1. Field of the Invention

The present invention relates to an imaging apparatus using an imaging element having a plurality of photoelectric conversion units included in each pixel and a method for controlling the same.

2. Description of the Related Art

In recent years, multifunctioning for imaging apparatuses using an imaging element such as a CMOS (complementary metal-oxide film semiconductor) sensor or the like has been developed. Not only generation of still image data or moving image data but also control of an imaging apparatus such as focus adjustment are performed based on image information obtained by an imaging element.

Japanese Patent Laid-Open No. 2001-124984 discloses a technique that performs pupil division focus detection using an imaging signal obtained from an imaging element. One microlens and two photodiodes are provided for each pixel of the imaging element, so that each photodiode receives light fluxes transmitted through different pupil areas of an image-taking lens. Focus detection can be performed by comparing output signals from adjacent ones of the photodiodes and captured image data can be generated by summing these output signals.

However, when focus detection is performed by acquiring signals from a plurality of photodiodes for each pixel, there is a concern about increase in a signal quantity to be read from the imaging element or increase in power consumption for focus detection calculation.

SUMMARY OF THE INVENTION

The present invention provides an imaging apparatus that is capable of performing a focus detecting operation during image capturing while suppressing power consumption and a method for controlling the same.

According to an aspect of the present invention, an imaging apparatus is provided that includes an imaging element that includes pixel portions each having a plurality of photoelectric conversion units and outputs a focus detecting signal and an image generating signal from each of the photoelectric conversion units; a drive unit configured to drive a focus adjusting lens; a calculation unit configured to acquire the focus detecting signal so as to perform phase difference detection-type focus detecting calculation; and a control unit configured to acquire the result of calculation performed by the calculation unit and control the drive unit so as to perform focus adjustment. The control unit controls the calculation unit to cause it to intermittently execute focus detecting calculation at a frequency set for a plurality of image frames.

According to the present invention, an imaging apparatus that is capable of performing a focus detecting operation during image capturing while suppressing power consumption and a method for controlling the same may be provided.

Further features of the present invention will become apparent from the following description of exemplary embodiments with reference to the attached drawings.

DESCRIPTION OF THE EMBODIMENTS

Figure 1:
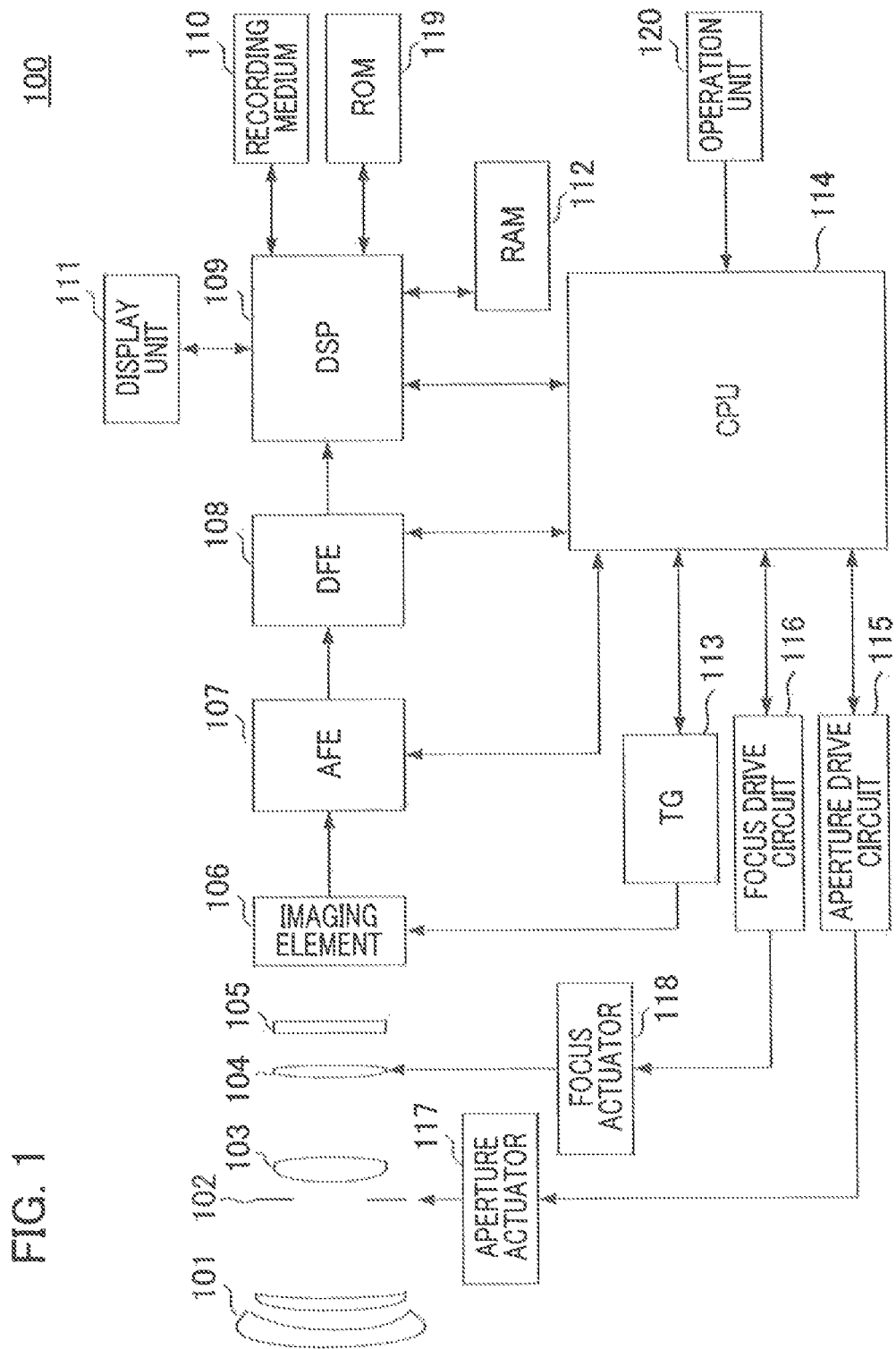
FIG. 1 is a diagram illustrating an overall configuration of an imaging apparatus according to an embodiment of the present invention.

Hereinafter, preferred embodiments of the present invention will be described with reference to the drawings. A description will be given of a configuration of an apparatus which is common to embodiments with reference to FIGS. 1 to 9. FIG. 1 is a diagram illustrating an overall configuration of an imaging apparatus 100 according to an embodiment of the present invention.

A first lens group 101 is an imaging optical system arranged at the front end (object side) of a lens barrel, and is held so as to be extendable and retractable in the optical axis direction. An aperture 102 adjusts its aperture diameter to adjust the light quantity when shooting. A second lens group 103 has a variable power action (zooming function) in synchronism with the reciprocal movement of the first lens group 101. A third lens group 104 is a focus-adjusting lens (focus lens) for focusing by advancing and retreating in the optical axis direction. An optical low-pass filter 105 is an optical element for reducing the false color or moiré of a shot image.

An imaging element 106 photoelectrically converts an object image imaged by the imaging optical system. In the present embodiment, a Bayer-pattern CMOS image sensor is used as the imaging element 106. Each pixel of the imaging element 106 has a plurality of photoelectric conversion units. A plurality of photodiodes (hereinafter abbreviated as "PD") is provided in each pixel to be described below. The number of PDs provided in one pixel portion is two or more (two, four, nine, or the like). In the present embodiment, a sub-pixel "a" and a sub-pixel "b" are respectively constituted by two PDs. An analog image signal output from the imaging element 106 is converted into a digital signal by an AFE (Analog Front End) 107. A digital image signal output from the AFE 107 is input to a DFE (Digital Front End) 108 for performing predetermined calculation processing. The DFE 108 detects an image deviation using signals obtained from the sub-pixels "a" and "b" in each pixel portion so as to perform correlation calculation for calculating a phase shift amount.

A DSP (Digital Signal Processor) 109 performs correction processing, development processing, or the like for a digital image signal output from the DFE 108. A recording medium 110 records image data processed by the DSP 109. A display unit 111 includes a liquid crystal display (LCD) or the like for displaying a shot image, various menu screens, and the like. A RAM (Random Access Memory) 112 is a device for temporarily storing image data or the like and is connected to the DSP 109. A timing generator (TG) 113 supplies a drive signal to the imaging element 106.

A CPU (Central Processing Unit) 114 controls the AFE 107, the DFE 108, the DSP 109, the TG 113, and an aperture drive circuit 115. Also, the CPU 114 performs AF (Auto Focus) control that calculates a focal shift amount (defocus amount) from the results of correlation calculation calculated by the DFE 108 so as to control a focus drive circuit 116 depending on the focal shift amount. The focus drive circuit 116 is a drive unit for driving a focus actuator 118 and performs focus adjustment by advancing and retracting the third lens group 104 in the optical axis direction. The aperture drive circuit 115 drives an aperture 102 by controlling an aperture actuator 117 in accordance with a control command given by the CPU 114. A ROM (Read Only Memory) 119 stores correction data or the like. An operation unit 120 includes a shutter switch button (SW). An instruction signal given by the user or photographer is input to the CPU 114 according to the user's or photographer's half-press or full press of the shutter switch button.

Figure 2:
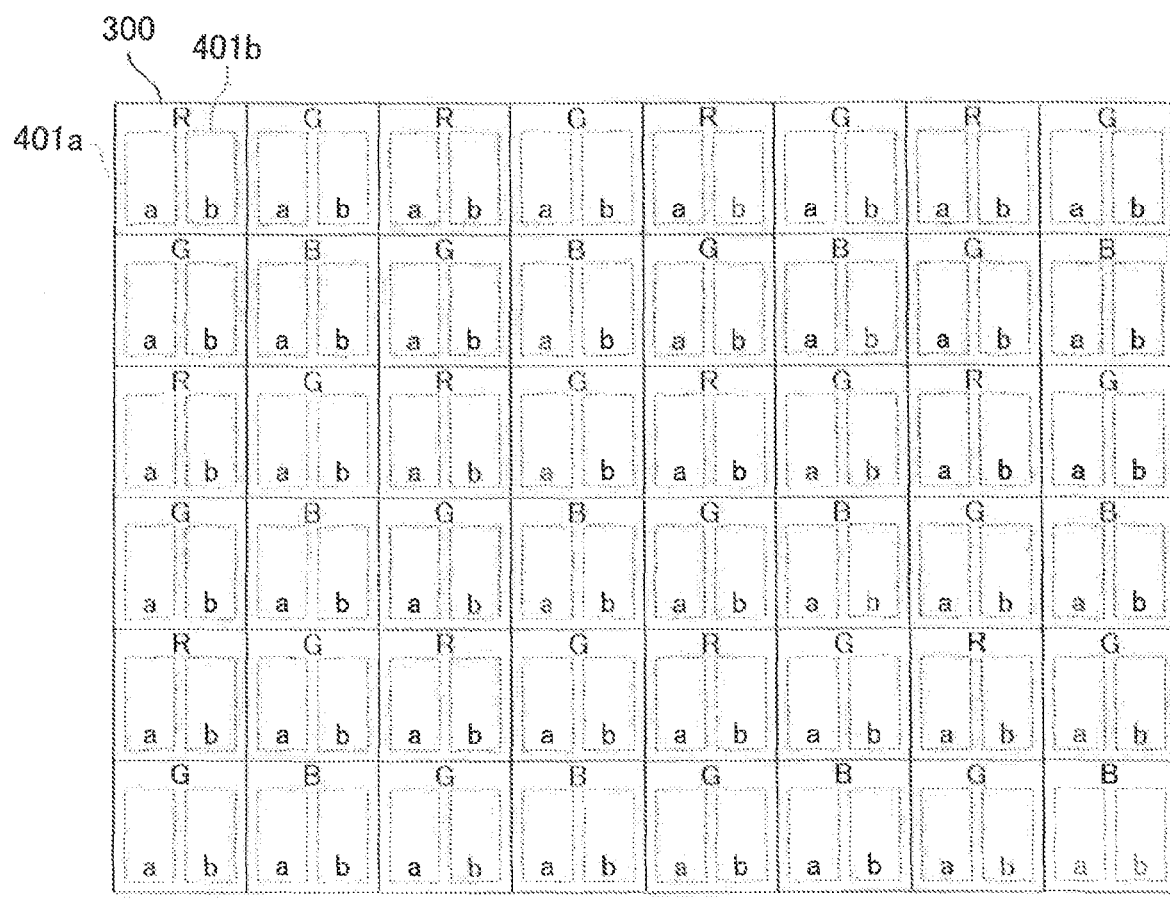
FIG. 2 is a diagram illustrating a pixel layout of an imaging element according to an embodiment of the present invention.

FIG. 2 is a schematic diagram illustrating an exemplary pixel layout of the imaging element 106. Unit pixel portions 300 are arrayed in rows and columns, and the red, green, and blue (RGB) color filters are arrayed in a Bayer-pattern. The sub-pixel "a" and the sub-pixel "b" are arrayed in each unit pixel portion 300. In FIG. 2, a PD 401a is a first photoelectric conversion unit constituting the sub-pixel "a" and a PD 401b is a second photoelectric conversion unit constituting the sub-pixel "b". The signals from the sub-pixel "a" and the sub-pixel "b" are used for focus detection. An a/b summed signal (hereinafter simply referred to as "summed signal") obtained by summing the signal from the sub-pixel "a" and the signal from the sub-pixel "b" is used for generating image data.

Figure 3:
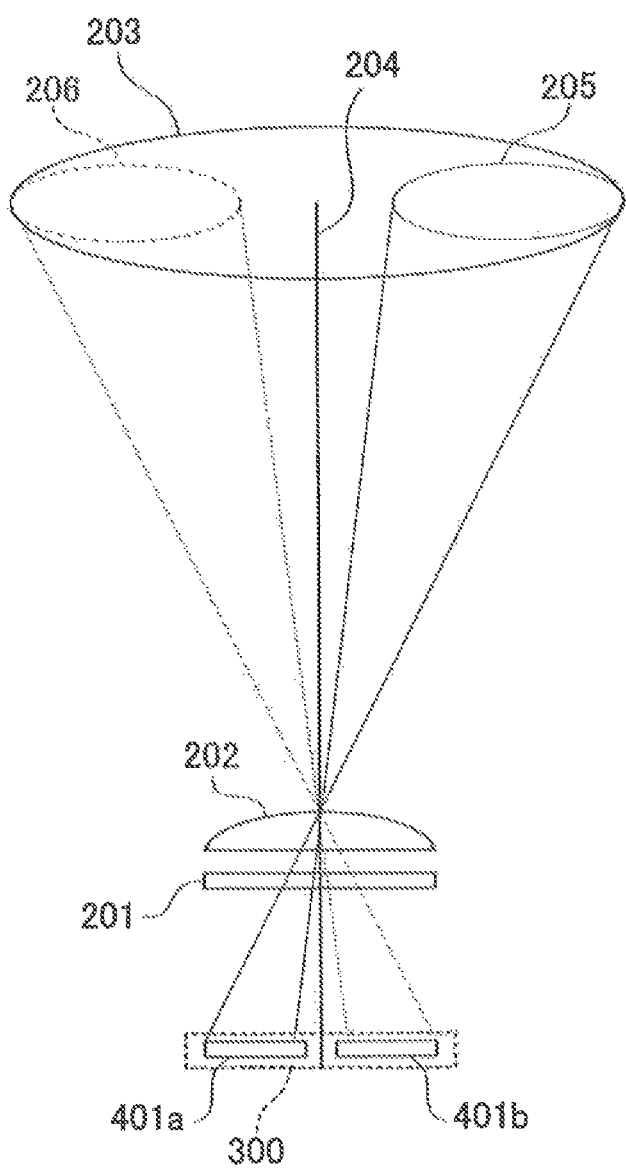
FIG. 3 is a schematic diagram illustrating the relationship between a light flux emerging from the exit pupil of an image-taking lens and a pixel.

FIG. 3 is a schematic diagram illustrating the relationship between light fluxes emitted from an exit pupil 203 of an image-taking lens constituted by the first to third lens groups and the aperture (see reference numerals 101 to 104 shown in FIG. 1) and the unit pixel portion 300. The unit pixel portion 300 has the PD 401a and the PD 401b. A color filter 201 and a microlens 202 are formed on the unit pixel portion 300.

The center of the light fluxes emitted from the exit pupil 203 to the pixel portion having the microlens 202 is defined as an optical axis 204. Light fluxes transmitted through the exit pupil 203 enter the unit pixel portion 300 about the optical axis 204. Each of areas 205 and 206 represent the partial region of the exit pupil 203 of the image-taking lens. The light flux transmitted through the area 205 as shown in FIG. 3 is received by the PD 401a (the sub-pixel "a") through the microlens 202. Also, the light flux transmitted through the pupil area 206 is received by the PD 401b (the sub-pixel "b") through the microlens 202. Thus, the sub-pixel "a" and the sub-pixel "b" receive the respective light fluxes transmitted through different areas of the exit pupil 203 of the image-taking lens. Thus, phase difference-type focus detection can be performed by comparing output signals from the sub-pixel "a" and the sub-pixel "b".

Figure 4A:
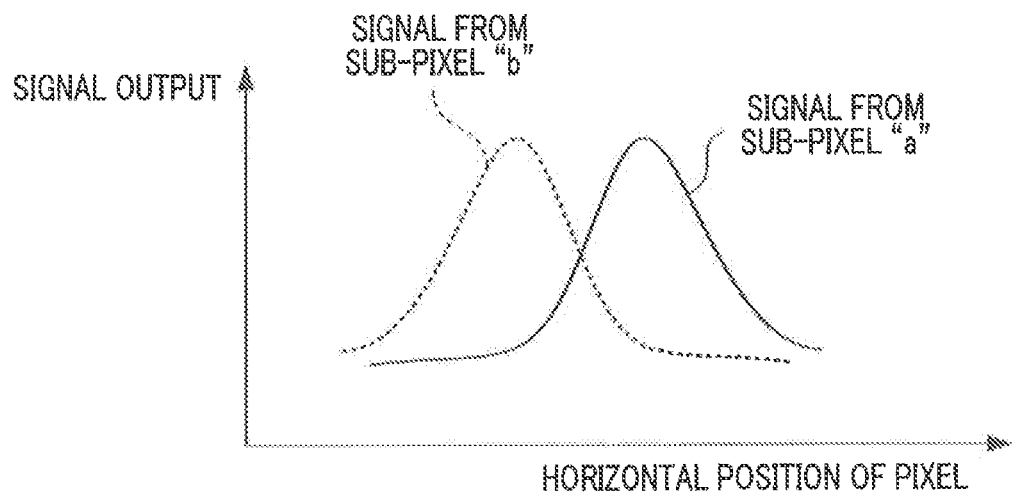
FIGS. 4A and 4B are schematic diagrams illustrating the relationship between a focus adjustment state and an image signal.
Figure 4B:
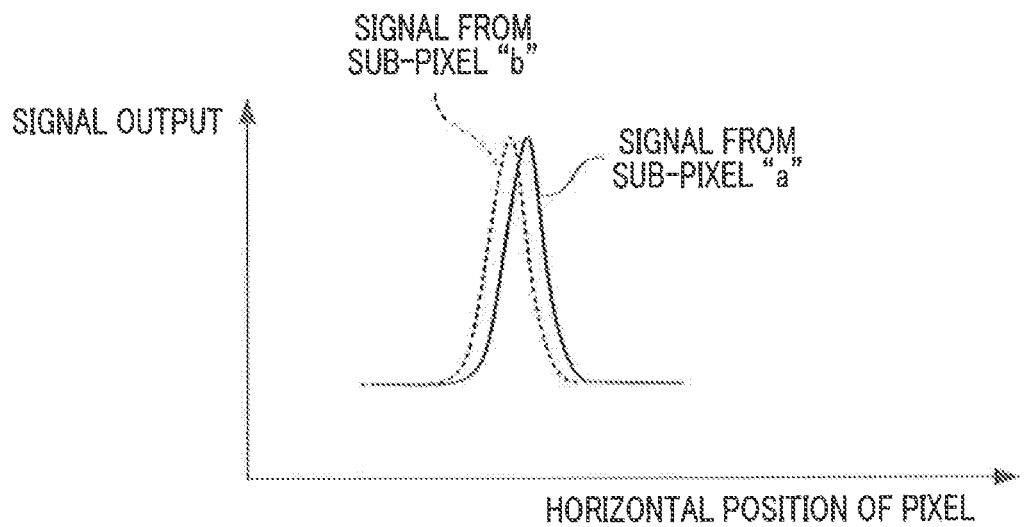

FIGS. 4A and 4B are schematic diagrams illustrating an image signal waveform obtained from the sub-pixel "a" and an image signal waveform obtained from the sub-pixel "b", where a pixel position in the horizontal direction is plotted on the horizontal axis and a signal output level is plotted on the vertical axis.

FIG. 4A illustrates image signal waveforms in an out-of-focus state. The image signal waveforms obtained from the sub-pixels "a" and "b" do not match but are offset from one another. As a state closes to the focused state, the offset between the image signal waveforms decreases as shown in FIG. 4B, and the image signal waveforms are overlapped in the focused state. As described above, a focal shift amount (defocus amount) can be detected by the correlation between image signal waveforms obtained from the sub-pixels "a" and "b" so that focus adjustment can be performed based on the detection result.

Figure 5:
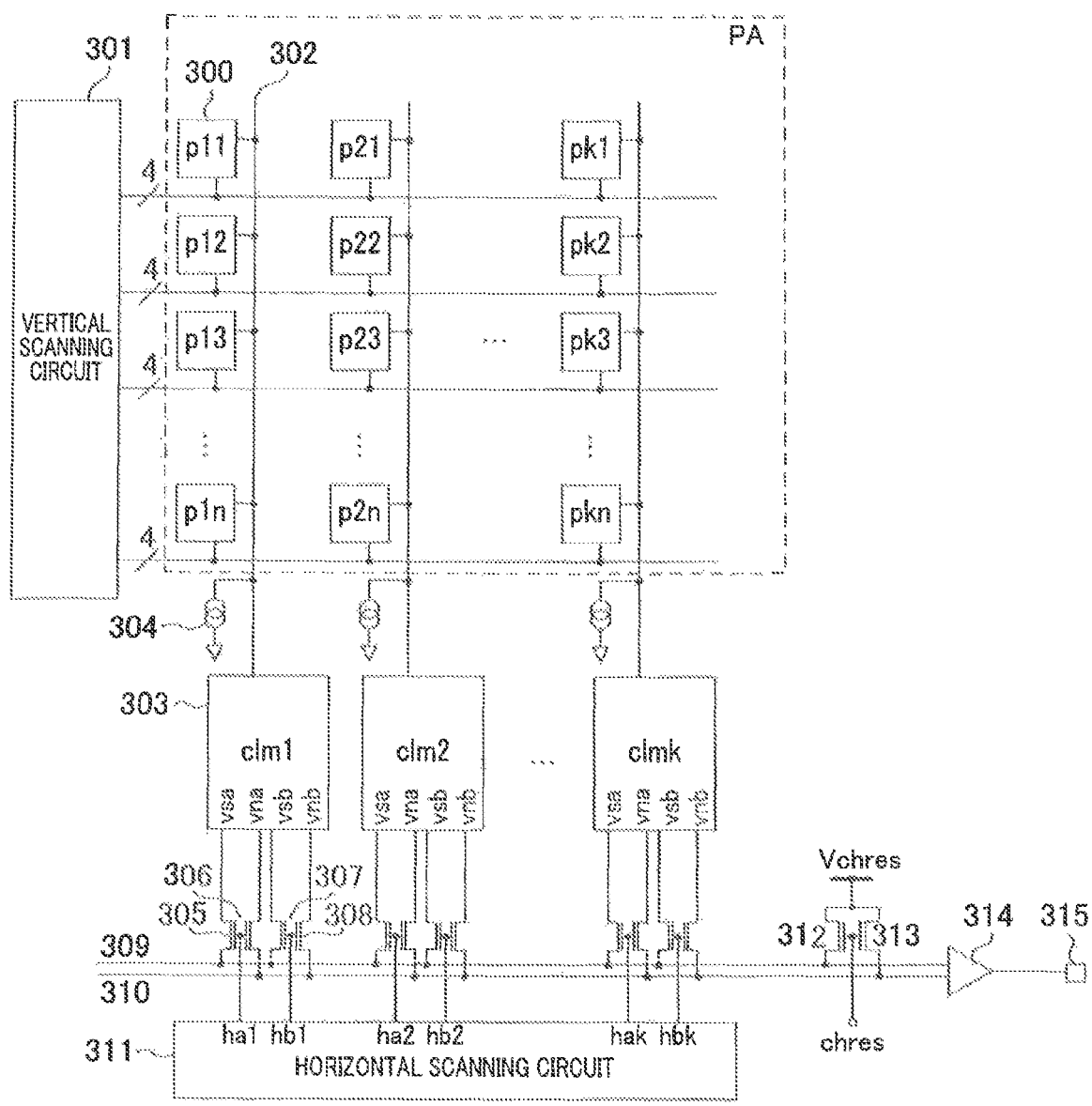
FIG. 5 is a diagram illustrating an overall configuration of an imaging element.
Figure 6:
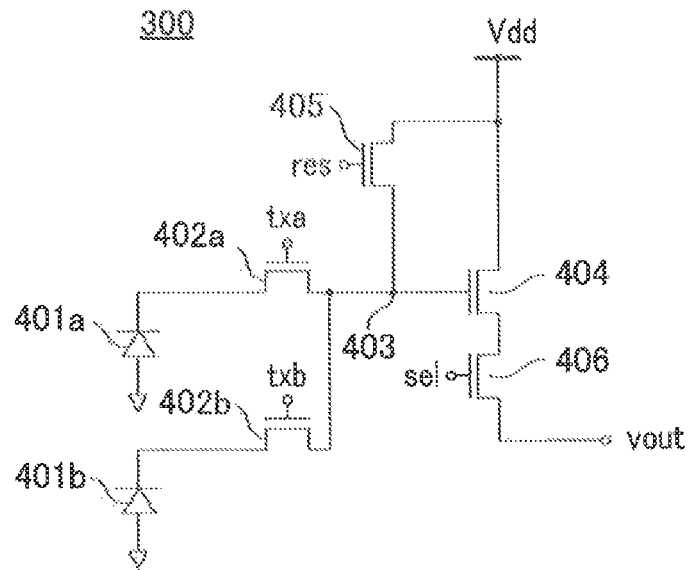
FIG. 6 is a diagram illustrating an exemplary circuit configuration of a pixel in an imaging element.
Figure 7:
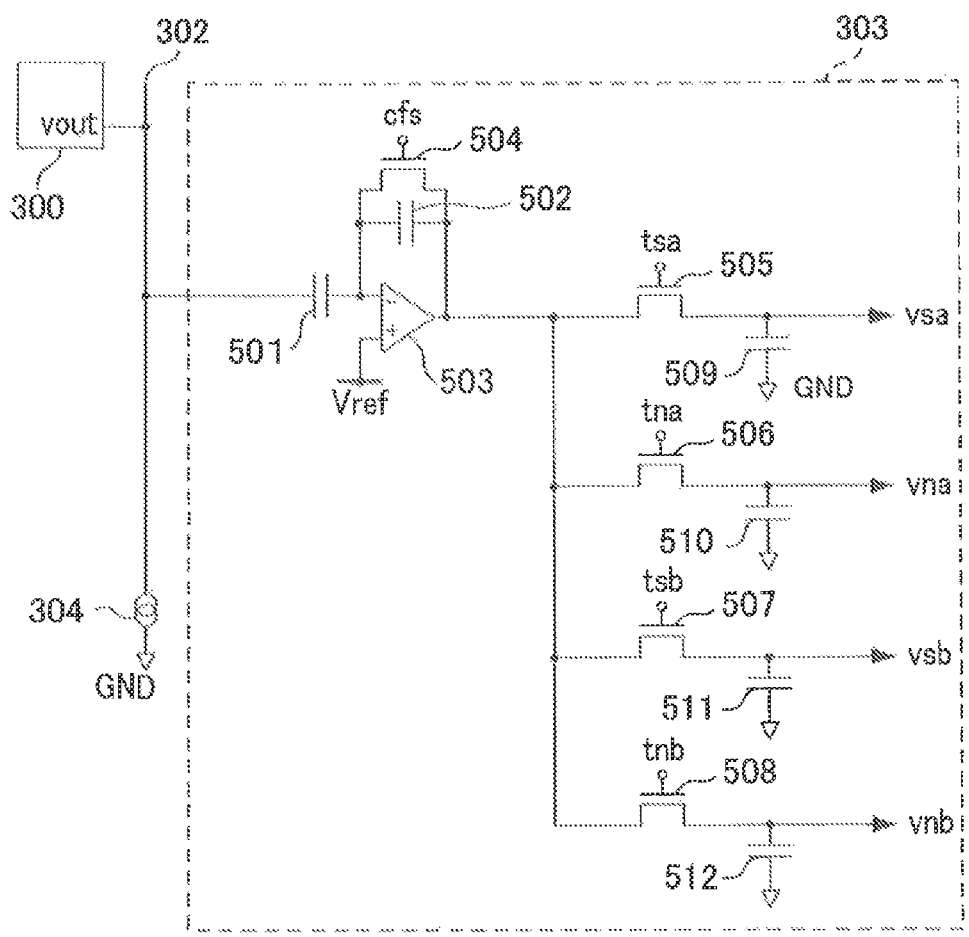
FIG. 7 is a diagram illustrating a configuration of a read circuit for each column of an imaging element.

Next, a description will be given of a configuration of the imaging element 106 with reference to FIG. 5 to FIG. 7. FIG. 5 is a diagram illustrating an overall configuration of the imaging element 106. FIG. 6 is a circuit diagram illustrating a configuration of the unit pixel portion 300. FIG. 7 is a circuit diagram illustrating a configuration of a column common read circuit 303.

A plurality of unit pixel portions 300 (see p11 to pkn) is arrayed in rows and columns on a pixel area PA shown in FIG. 5. A description will be given of a configuration of the unit pixel portion 300 with reference to FIG. 6.

The PDs 401a and 401b photoelectrically convert incident light and accumulate electric charges depending on an exposure amount. Transfer gates 402a and 402b are set in an ON state by setting signals txa and txb to High level. In this manner, electric charges accumulated in the PDs 401a and 401b are transferred to an FD (Floating Diffusion) unit 403. The FD unit 403 is connected to a gate of a floating diffusion amplifier 404 (hereinafter referred to as "FD amplifier"). The FD amplifier 404 converts the amount of electric charges transferred from the PDs 401a and 401b into a voltage amount. An FD reset switch 405 resets the FD unit 403 by setting a signal res to High level. Also, when electric charges accumulated in the PDs 401a and 401b are reset, the signal res, the signal txa, and the signal txb are simultaneously set to High level. When the transfer gates 402a and 402b and the FD reset switch 405 are in an ON state, the PDs 401a and 401b are reset via the FD unit 403. A pixel selection switch 406 sets a signal sel to High level, and thus, a pixel signal converted into a voltage by the FD amplifier 404 is output from the output terminal vout of the unit pixel portion 300.

A vertical scanning circuit 301 shown in FIG. 5 supplies gate control signals (res, txa, txb, and sel) to transistors provided in the unit pixel portion 300. These signals are common for each row. The output terminal vout of each of the unit pixel portions 300 is connected to the column common read circuit 303 via a vertical output line 302 for each column. A description will be given of a configuration of the column common read circuit 303 with reference to FIG. 7.

The vertical output line 302 is provided for each column and is connected to the output terminals vout of the unit pixel portions 300 for one column. The vertical output line 302 is connected to a current source 304. A source follower circuit is constituted by the current source 304, and the FD amplifiers 404 of the unit pixel portions 300 connected to the vertical output line 302.

A clamp capacitor (C1) 501 is connected to the inversed input terminal of a calculation amplifier 503. A feedback capacitor (C2) 502 is connected to the output terminal and the inversed input terminal of the calculation amplifier 503. A reference power source Vref is connected to the non-inversed input terminal of the calculation amplifier 503. A switch 504 is a transistor for shorting-out the opposite ends of the feedback capacitor C2 and is controlled by a signal cfs. Transfer switches 505 to 508 are transistors that transfer signals read from the unit pixel portions 300 to signal storage capacitors 509 to 512, respectively. By the following read operation to be described below, a pixel signal Sa from the sub-pixel "a" is stored in the first signal S storage capacitor 509, and a summed signal Sab obtained by summing a signal from the sub-pixel "a" and a signal from the sub-pixel "b" is stored in the second signal S storage capacitor 511. Each of the first signal N storage capacitor 510 and the second signal N storage capacitor 512 stores a noise signal N from the unit pixel portion 300. The signal storage capacitors 509 to 512 are respectively connected to the output terminals vsa, vna, vsb, and vnb of the column common read circuit 303.

Horizontal transfer switches 305 and 306 are respectively connected to the output terminals vsa and vna of the column common read circuit 303 shown in FIG. 5. The horizontal transfer switches 305 and 306 are controlled by an output signal ha* (* represents any column number) from a horizontal scanning circuit 311. By setting the signal ha* to High level, the signals from the first signal S storage capacitor 509 and the first signal N storage capacitor 510 are transferred to horizontal output lines 309 and 310, respectively.

Also, horizontal transfer switches 307 and 308 are connected to the output terminals vsb and vnb of the column common read circuit 303, respectively. The horizontal transfer switches 307 and 308 are controlled by an output signal hb* (* represents any column number) from the horizontal scanning circuit 311. By setting the signal hb* to High level, the signals from the second signal S storage capacitor 511 and the second signal N storage capacitor 512 are transferred to the horizontal output lines 309 and 310, respectively.

The horizontal output lines 309 and 310 are connected to the input terminals of a differential amplifier 314. The differential amplifier 314 calculates a difference between the signal S and the signal N and simultaneously multiplies the difference by a predetermined gain so as to output a final output signal to an output terminal 315. Horizontal output line reset switches 312 and 313 are in an ON state by setting a signal chres to High level, and the horizontal output lines 309 and 310 are set to reset voltages Vchres (reset).

Figure 8:
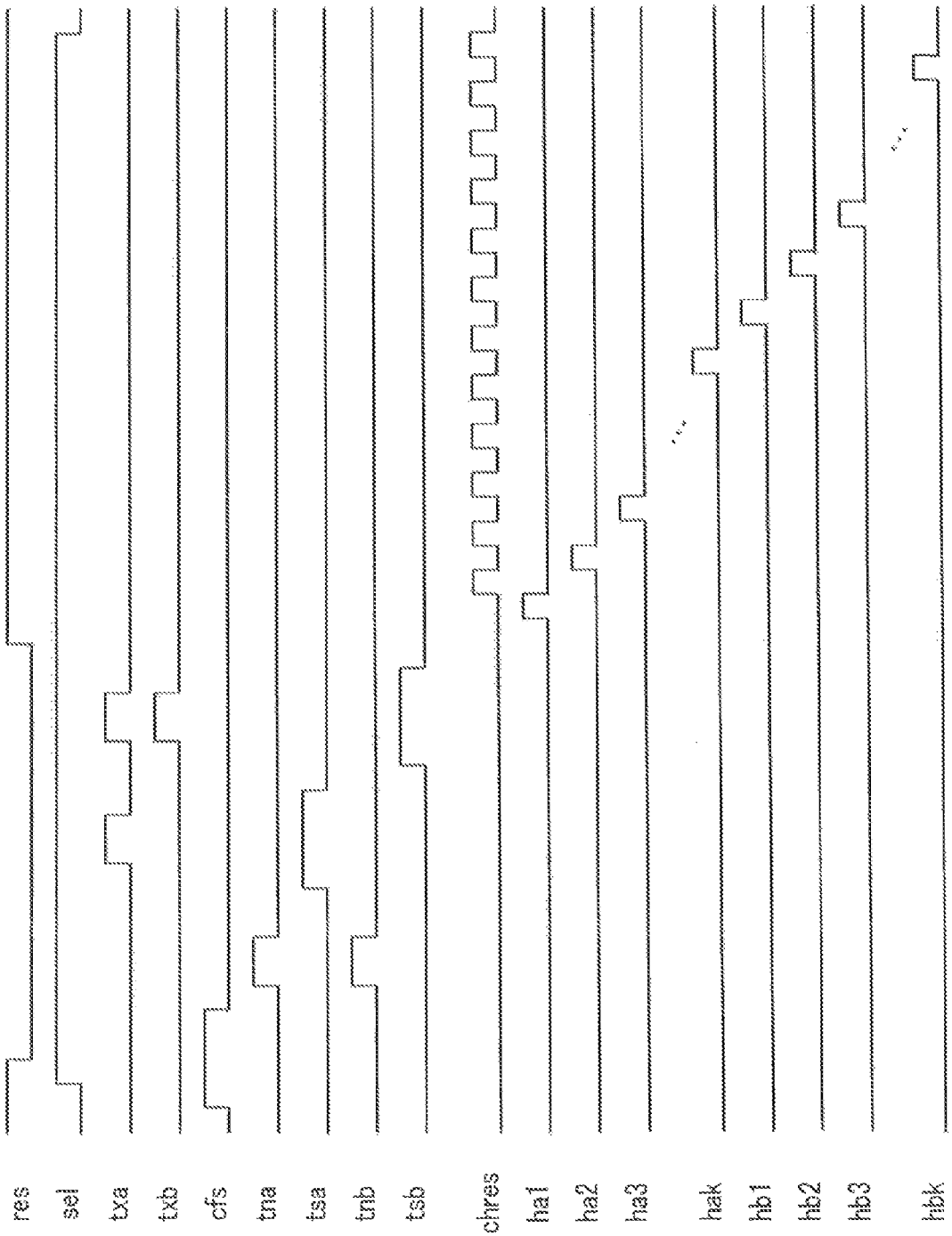
FIG. 8 is a timing chart illustrating a read operation for reading each row of an imaging element.

Next, a description will be given of a read operation performed by the imaging element 106 with reference to FIG. 8. FIG. 8 is a timing chart illustrating a read operation for reading each row of the imaging element 106.

Firstly, the switch 504 shown in FIG. 7 is in an ON state by setting the signal cfs to High level, and then the calculation amplifier 503 is in a buffer state. Next, when the signal sel is set to High level, the pixel selection switch 406 shown in FIG. 6 is turned ON. Then, the FD reset switch 405 is turned OFF by setting the signal res to Low level, and then, the reset of the FD unit 403 is released. Next, after the switch 504 is turned OFF by returning the signal cfs to Low level, signals tna and tnb are set to High level. In this manner, the signal N is stored in the first signal N storage capacitor 510 and the second signal N storage capacitor 512 via transfer switches 506 and 508.

Next, when the signals tna and tnb are set to Low level, the transfer switches 506 and 508 are turned OFF. Then, control is performed such that the transfer switch 505 is turned ON by setting a signal tsa to High level and the transfer gate 402a is turned ON by setting the signal txa to High level. In the course of this operation, the signals accumulated in the PD 401a of the sub-pixel "a" are output to the vertical output line 302 via the FD amplifier 404 and the pixel selection switch 406. The signal from the vertical output line 302 is amplified by a gain corresponding to a capacity ratio between the clamp capacitor C1 and the feedback capacitor C2 by the calculation amplifier 503, and is stored in the first signal S storage capacitor 509 via the transfer switch 505 (the pixel signal Sa).

Next, the signal txa and the signal tsa are sequentially set to Low level. Then, the transfer switch 507 is turned ON by setting a signal tsb to High level and the transfer gates 402a and 402b are turned ON by setting the signals txa and txb to High level. In the course of this operation, the signals accumulated in the PD 401b of the sub-pixel "b" are summed with a signal from the sub-pixel "a" in the FD unit 403. The signal after summation is output to the vertical output line 302 via the FD amplifier 404 and the pixel selection switch 406. A signal from the vertical output line 302 is amplified by a gain corresponding to a capacity ratio between the clamp capacitor C1 and the feedback capacitor C2 by the calculation amplifier 503, and is stored in the second signal S storage capacitor 511 via the transfer switch 507 (summed signal Sab).

When the signal res is set to High level after the transfer gates 402a and 402b and the transfer switch 507 are sequentially turned OFF, the FD reset switch 405 is turned ON and the FD unit 403 is reset.

Next, the horizontal transfer switches 305 and 306 are turned ON by setting the output ha1 from the horizontal scanning circuit 311 to High level. The signals from the first signal S storage capacitor 509 and the first signal N storage capacitor 510 are output to the output terminal 315 via the horizontal output lines 309 and 310 and the differential amplifier 314. The horizontal scanning circuit 311 sets selected signals ha1, ha2, ..., and hak for each column to High level in sequence so as to output signals (image signals A) from the sub-pixels "a" for one row.

Upon completion of reading the image signal A, the output hb1 from the horizontal scanning circuit 311 is set to High level. In this manner, the horizontal transfer switches 307 and 308 are turned ON, and the signals from the second signal S storage capacitor 511 and the second signal N storage capacitor 512 are output to the output terminal 315 via the horizontal output lines 309 and 310 and the differential amplifier 314. The horizontal scanning circuit 311 sets selected signals hb1, hb2, ..., and hbk for each column to High level in sequence so as to output a summed signal (the image signal AB) for one row.

In a period of time during which the signals for the respective columns are read by the signals ha1 to hak and the signals hb1 to hbk, the horizontal output line reset switches 312 and 313 are temporarily turned ON by setting the signal chres to High level. At this time, the horizontal output lines 309 and 310 are reset to a level of reset voltage Vchres.

Figure 9:
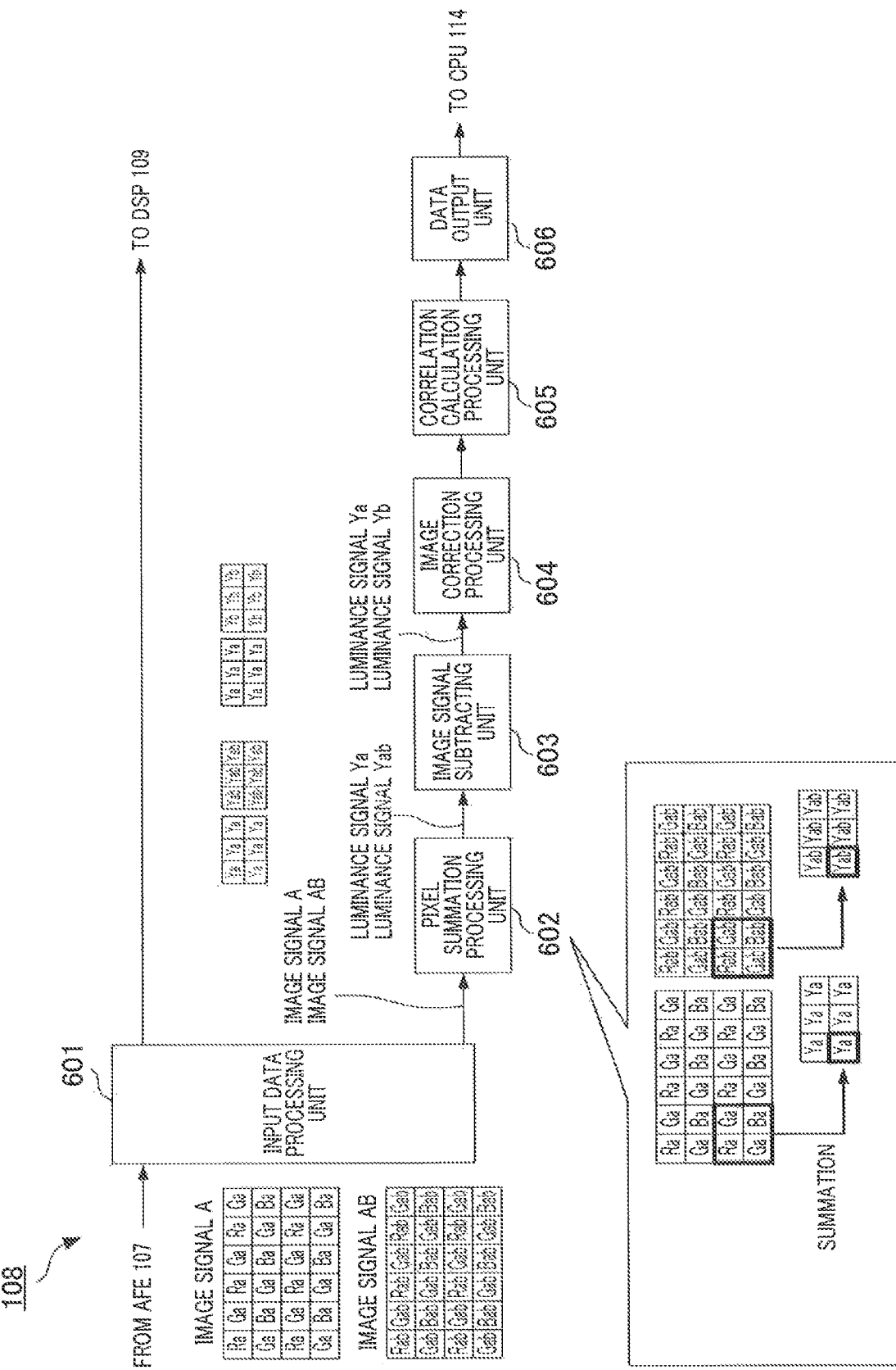
FIG. 9 is a schematic diagram illustrating an exemplary configuration of an image signal processing unit (DFE 108).

Next, a description will be given of the DFE 108 with reference to FIG. 9. FIG. 9 is a block diagram illustrating a configuration of the DFE 108.

A signal read from the imaging element 106 by the aforementioned read operation is input to an input data processing unit 601 via the AFE 107. The input data processing unit 601 outputs the image signal A and the image signal AB both input from the AFE 107 to a pixel summation processing unit 602 and outputs the image signal AB only to the DSP 109. The image signal A is a focus detecting signal and the image signal AB is a signal for both focus detection and image generation.

The pixel summation processing unit 602, an image signal subtracting unit 603, an image correction processing unit 604, a correlation calculation processing unit 605, and a data output unit 606 are calculation units for performing phase difference detection-type focus detecting calculation and are operated under the control of the CPU 114. The pixel summation processing unit 602 performs pixel summation processing for the image signal A and the image signal AB. For a pixel group having two rows and two columns, pixel signals are summed in Bayer units so as to obtain a luminance signal. By means of such processing, the number of data in the image signal A and the image signal AB are reduced by ½ in the horizontal direction and the vertical direction, respectively. The image signal subtracting unit 603 acquires a luminance signal AB (denoted as "Yab") and a luminance signal A (denoted as "Ya") from the pixel summation processing unit 602, and subtracts Ya from Yab so as to generate a luminance signal B (denoted as "Yb"). Since Yab is a luminance signal obtained by summing a signal from the sub-pixel "a" and a signal from the sub-pixel "b" and Ya is a luminance signal from the sub-pixel "a", Yb which is a difference between Yab and Ya represents a luminance signal from the sub-pixel "b".

The image correction processing unit 604 performs correction processing such as fixed pattern noise removal for Ya and Yb acquired from the image signal subtracting unit 603. The correlation calculation processing unit 605 calculates a correlation value Cm(x) from the signal waveforms of Ya and Yb. As a method for calculating a correlation value, the following formula is used:

$$Cm(x) = \sum_{n=p}^{q} (Ya_n - Yb_{n+x})^2 \quad \text{[Formula 1]}$$

In this case, the minimum point of the correlation value Cm(x) is a highest correlation point. A correlation value may also be calculated from the absolute value of the difference between Ya and Yb. A correlation value may also be calculated from the following formula:

$$Cm(x) = \sum_{n=p}^{q} \text{MAX}(Ya_n, Yb_{n+x}) \quad \text{[Formula 2]}$$

MAX (A, B) denotes to select the greater of A and B. A correlation value may also be calculated by a method for selecting the smaller of A and B.

The data output unit 606 outputs the correlation value Cm(x) calculated by the correlation calculation processing unit 605 to the CPU 114. The CPU 114 selects the highest correlation point from the acquired correlation value Cm(x) so as to calculate a defocus amount. The CPU 114 controls the focus drive circuit 116 based on the calculated defocus amount.

First Embodiment

Hereinafter, a description will be given of the sequence of an imaging operation and an AF operation according to a first embodiment of the present invention with reference to FIG. 10.

Figure 10:
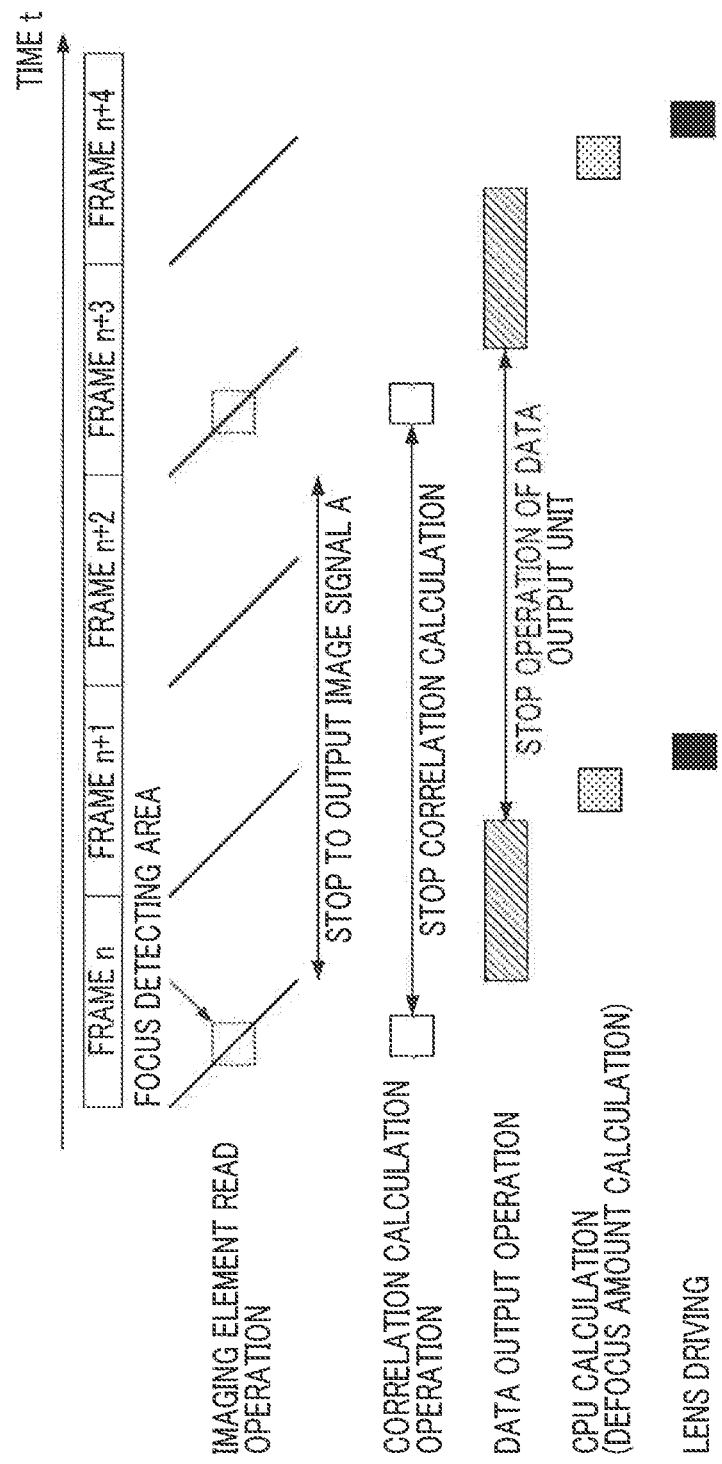
FIG. 10 is a schematic diagram illustrating a read operation and an AF operation performed by an imaging element according to a first embodiment of the present invention.

FIG. 10 is a diagram illustrating a read operation and an AF operation performed by an imaging element during moving image capturing. A moving image frame n represents an nth frame, and image frames n to n+4 are shown in FIG. 10. A read operation of the imaging element 106, a correlation calculation operation, and a data output operation, defocus calculation processing performed by the CPU 114, and driving of a focus lens are shown underneath thereof.

Firstly, signals from the imaging element 106 are sequentially read from the leading line in accordance with the aforementioned read operation for the nth frame (image frame n). At this time, both the image signal A and the image signal AB are read from each line. A rectangular frame shown by a dotted line in FIG. 10 represents an area (focus detecting area) for focus detection. The focus detecting area is an area corresponding to pixel portions within the range targeted for focus detecting calculation. When a signal in the focus detecting area is started to be read, the correlation calculation processing unit 605 starts image correlation calculation processing using the signal. Then, correlation calculation is performed for the signal in the focus detecting area. The content of correlation calculation is as described above.

Upon completion of correlation calculation processing, the result of calculation is then output from the data output unit 606 to the CPU 114. At this time, in the present embodiment, after the read operation of the imaging element 106 is all completed, the data output operation of the data output unit 606 starts. In this manner, data output is always started at the same timing irrespective of the position of the focus detecting area within an imaging screen. The CPU 114 calculates a defocus amount based on the received correlation calculation data so as to control driving of the focus drive circuit 116.

Correlation calculation is stopped in the subsequent frames n+1 and n+2. Thus, the imaging element 106 stops to output the image signal A which is unnecessary for calculation processing under the control of the CPU 114. Consequently, power consumption can be correspondingly reduced. For example, power consumption can be reduced by blocking the current in the differential amplifier 314 during an output period of the image signal A and by stopping the operation of the horizontal scanning circuit 311. The CPU 114 correspondingly stops the operation of the correlation calculation processing unit 605 and the data output unit 606. In this manner, the power of the DFE 108 can be reduced. Furthermore, the operation of the pixel summation processing unit 602, the image signal subtracting unit 603, and the image correction processing unit 604 are also stopped during the period (period during which correlation calculation is stopped), so that power consumption can be reduced. A reduction in power consumption can be realized by stopping clock supply to each block. Defocus calculation processing and lens driving are not performed in a period during which correlation calculation is not performed.

In the subsequent frame n+3, the processing for reading the image signal A and the image signal AB from the imaging element 106 is executed again as in the frame n, so that the aforementioned series of AF processing are performed.

In accordance with the above configuration, the AF processing is executed at a rate of once in three frames. The operation of circuit units which are not used is stopped as described above in an image frame period during which the AF processing is not performed, so that the entire power consumption can be reduced.

While, in the present embodiment, the AF processing is performed at a rate of once in three frames, the present invention is not limited thereto. The ratio of a frame to which the AF processing is performed and a frame to which the AF processing is not performed may also be changed depending on the configuration and specification of the apparatus. Power consumption may also be controlled at a constant level by changing the rate depending on a frame rate. For example, the AF processing is set at a rate of once in three frames in an image capture mode with a rate of 30 frames/sec. In an image capture mode with a rate of 60 frames/sec, the AF processing may be set at a rate of once in six frames, so that the power consumption of circuit units involved in AF processing can be set at a constant level in any mode.

Second Embodiment

Next, a description will be given of a second embodiment of the present invention. In the first embodiment, the AF processing is performed at a rate of once in a few frames, so that power consumption can be suppressed. However, there is a concern about decrease in follow-up capability of focus adjustment for the movement of an object. Since the requirements of follow-up capability are not so high during moving image capturing, it is sufficient to perform the AF processing at a rate of once for a plurality of image frames. However, the follow-up capability performance becomes important for a live-view operation prior to still image capturing. Hence, in the second embodiment of the present invention, there are provided two modes: a first mode in which the AF processing is performed at a rate of once in a few frames and a second mode in which the AF processing is performed at a frequency more than that in the first mode. For example, in the second mode, focus detecting calculation is executed for every moving image frame. In this manner, the entire power consumption can be suppressed without losing follow-up capability immediately preceding still image capturing.

Figure 11:
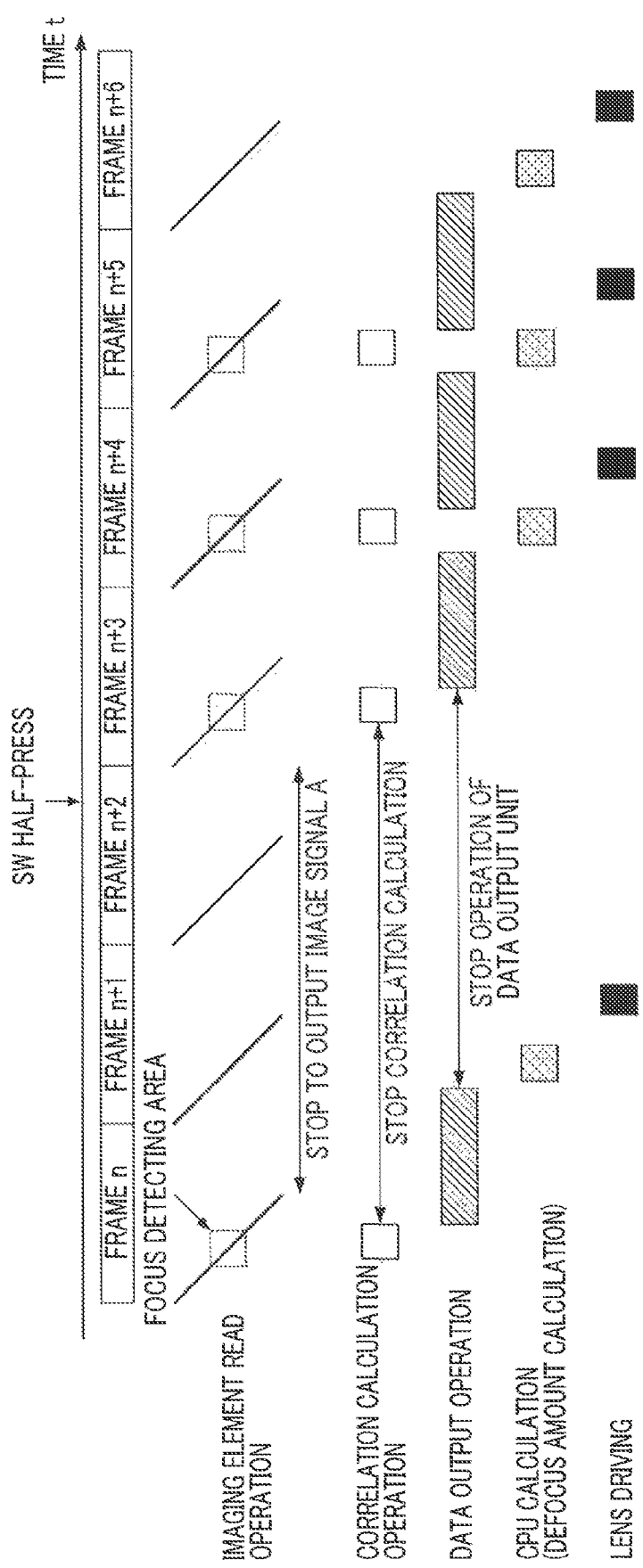
FIG. 11 is a schematic diagram illustrating a read operation and an AF operation performed by an imaging element according to a second embodiment of the present invention.

FIG. 11 is a schematic diagram illustrating a read operation and an AF operation performed by an imaging element during moving image capturing according to a second embodiment of the present invention. Image frames n to n+6 are shown in FIG. 11.

In a period from the frame n to the frame n+2, the AF processing is performed at a rate of once in three frames as in the description with reference to FIG. 10. When a half-press operation of a shutter switch (SW) is performed by a photographer in a period of the frame n+2, the CPU 114 receives still image capturing instructions so as to continuously execute the AF processing for each frame from the frame n+3 to the frame n+5. At this time, the CPU 114 starts the data output operation of the data output unit 606 immediately after completion of correlation calculation processing performed by the correlation calculation processing unit 605. In the case shown in FIG. 10, the data output operation starts after the read operation of the imaging element 106 is all completed. In this case, data output may not be completed before the correlation calculation processing for the next frame starts depending on the time required for data output and the position of the focus detecting area in the next frame. Thus, in FIG. 11, a data output operation starts immediately after completion of calculation processing performed by the correlation calculation processing unit 605, so that data output can be completed before the correlation calculation processing for the next frame starts. It should be noted that, although data output timing may change depending on the position settings of the focus detecting area, the AF processing for each frame is ensured. Even in the case of the data output timing shown in FIG. 10, the AF processing can be performed for each frame if a buffer memory for temporarily storing data is provided between the correlation calculation processing unit 605 and the data output unit 606.

After the focus lens is in a focused state by being moved by the AF operation, the AF processing is intermittently performed again for the frame n+6 and subsequent frames, so that the imaging apparatus enters the power-saving mode.

With the aid of the above configuration, the entire power consumption can be reduced by suppressing power consumption in other periods without losing AF follow-up capability required for the immediately preceding still image capturing.

In the present embodiment, a description has been given by taking an example in which the AF processing is performed for each frame in a period immediately after the shutter switch (SW) receives the half-press operation, whereas the AF processing is intermittently performed at a rate of once in three frames in other periods. The frequency of the AF processing is not limited thereto. For example, the AF processing may be performed at a rate of once in three frames in a period immediately after the shutter switch receives the half-press operation and the frequency of the AF processing may further be reduced or no AF processing may be performed in other periods. The frequency of the AF processing may also be changed by detecting other state changes instead of detecting the half-press operation of the shutter switch.

While the present invention has been described with reference to exemplary embodiments, it is to be understood that the present invention is not limited to the disclosed exemplary embodiments but various modifications and variations can be made in the present invention without departing from the scope or spirit of the present invention. For example, various modifications and variations are as follows:

The case where image signal information for signals for use in AF processing is used as it is without summing pixels.

The case where the correlation calculation processing unit 605 is included in the DSP 109 or the CPU 114.

The case where the output of the image signal A from the imaging element 106 is stopped and the operation of the AFE 107 is further stopped in a frame period during which correlation calculation is not performed so as to reduce power consumption.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-055926, filed on Mar. 19, 2013, which is hereby incorporated by reference herein in its entirety.

What is claimed is:

1. An imaging apparatus comprising:
   an imaging element that includes pixel portions each having a plurality of photoelectric conversion units;
   a drive unit configured to drive a focus adjusting lens;
   a first processing unit configured to acquire a signal output by the imaging element and to output a first image signal for a focus detection and a second image signal for the focus detection and an image generation;

a second processing unit configured to acquire the second image signal from the first processing unit so as to perform development processing;

a calculation unit configured to acquire the first image signal and the second image signal from the first processing unit so as to perform phase difference detection-type focus detecting calculation by correlation calculation between the first image signal and a third image signal generated from the first image signal and the second image signal; and a control unit configured to acquire data indicating the result of the correlation calculation so as to calculate a defocus amount and to control the drive unit so as to perform focus adjustment, wherein the control unit controls the calculation unit, and wherein an output of the data indicating the result of the correlation calculation from the calculation unit to the control unit is intermittently performed at a frequency set for a plurality of image frames in accordance with an output of the second image signal from the first processing unit to the second processing unit.

2. An imaging apparatus comprising:

an imaging element that includes pixel portions each having a plurality of photoelectric conversion units;

a drive unit configured to drive a focus adjusting lens;

a first processing unit configured to acquire a signal output by the imaging element and to output a first image signal for a focus detection and a second image signal for the focus detection and an image generation;

a second processing unit configured to acquire the second image signal from the first processing unit so as to perform development processing;

a calculation unit configured to acquire the first image signal and the second image signal from the first processing unit so as to perform phase difference detection-type focus detecting calculation by correlation calculation between the first image signal and a third image signal generated from the first image signal and the second image signal; and a control unit configured to acquire data indicating the result of the correlation calculation so as to calculate a defocus amount and to control the drive unit so as to perform focus adjustment, wherein the control unit controls the calculation unit, and wherein an output of the data indicating the result of the correlation calculation from the calculation unit to the control unit (a) is performed at a rate of once for a plurality of image frames in a first mode and (b) is performed at a frequency more than that in the first mode in a second mode, in accordance with an output of the second image signal from the first processing unit to the second processing unit.

3. The imaging apparatus according to claim 1, wherein the calculation unit comprises a data output unit configured to output the data indicating the result of the correlation calculation, and the control unit stops the operation of the data output unit in a frame period during which the focus detecting calculation is not performed.

4. The imaging apparatus according to claim 2, wherein the calculation unit comprises a data output unit configured to output the data indicating the result of the correlation calculation, and the control unit stops the operation of the data output unit in a frame period during which the focus detecting calculation is not performed.

5. The imaging apparatus according to claim 1, wherein the calculation unit comprises a correlation calculation processing unit configured to perform correlation calculation between the first image signal and the third image signal, and the control unit stops processing performed by the correlation calculation processing unit in a frame period during which the focus detecting calculation is not performed.

6. The imaging apparatus according to claim 2, further comprising:

an operation unit configured to provide still image capturing instructions, wherein, when the control unit receives still image capturing instructions from the operation unit, the control unit controls to change an operation mode to the second mode.

7. The imaging apparatus according to claim 6, wherein the calculation unit comprises a data output unit configured to output the data indicating the result of the correlation calculation and a correlation calculation processing unit configured to perform correlation calculation between the first image signal and the third image signal, and the control unit controls to start the operation of the data output unit immediately after correlation calculation by the correlation calculation processing unit in a frame period during which the focus detecting calculation is performed in the second mode, whereas the control unit controls to stop the operation of the data output unit and the processing by the correlation calculation processing unit in a frame period during which the focus detecting calculation is not performed.

8. The imaging apparatus according to claim 7, wherein, after completion of a read operation by the imaging element in the first mode, the control unit controls to start the operation of the data output unit.

9. The imaging apparatus according to claim 1, wherein the control unit changes a timing for outputting the data indicating the result of the correlation calculation depending on the position of a focus detecting area calculated by the calculation unit.

10. The imaging apparatus according to claim 1, wherein the control unit controls to stop clock supply to the calculation unit in a frame period during which the focus detecting calculation is not performed.

11. The imaging apparatus according to claim 1, wherein the control unit controls to stop output of a focus detecting signal from the imaging element in a frame period during which the focus detecting calculation is not performed.

12. A control method executed by an imaging apparatus that comprises (a) an imaging element that includes pixel portions each having a plurality of photoelectric conversion units and (b) a drive unit configured to drive a focus adjusting lens, the control method comprising:

acquiring, by a first processing unit, a signal output by the imaging element and outputting a first image signal for a focus detection and a second image signal for the focus detection and an image generation;

acquiring, by a second processing unit, the second image signal from the first processing unit so as to perform development processing;

acquiring, by a calculation unit, the first image signal and the second image signal from the first processing unit so as to perform phase difference detection-type focus detecting calculation by correlation calculation between the first image signal and a third image signal generated from the first image signal and the second image signal; and acquiring, by a control unit, data indicating the result of the correlation calculation so as to calculate a defocus amount, and controlling the drive unit so as to perform focus adjustment, wherein, in the calculation unit, an output of the data indicating the result of the correlation calculation from the calculation unit to the control unit is intermittently performed at a frequency set for a plurality of image frames in accordance with an output of the second image signal from the first processing unit to the second processing unit.

13. A control method executed by an imaging apparatus that comprises (a) an imaging element that includes pixel portions each having a plurality of photoelectric conversion units and (b) a drive unit configured to drive a focus adjusting lens, the control method comprising:
  acquiring, by a first processing unit, a signal output by the imaging element and outputting a first image signal for a focus detection and a second image signal for the focus detection and an image generation;
  acquiring, by a second processing unit, the second image signal from the first processing unit so as to perform development processing;
  acquiring, by a calculation unit, the first image signal and the second image signal from the first processing unit so as to perform phase difference detection-type focus detecting calculation by correlation calculation between the first image signal and a third image signal generated from the first image signal and the second image signal; and
  acquiring, by a control unit, data indicating the result of the correlation calculation so as to calculate a defocus amount and controlling the drive unit so as to perform focus adjustment,
  wherein, in the calculation unit, an output of the data indicating the result of the correlation calculation unit to the control unit (a) is performed at a rate of once in a plurality of image frames in a first mode and (b) is performed at a frequency more than that in the first mode in a second mode, in accordance with an output of the second image signal from the first processing unit to the second processing unit.

14. An imaging apparatus comprising:
  an imaging element that includes pixel portions each having a plurality of photoelectric conversion units;
  a drive unit configured to drive a focus adjusting lens;
  a memory; and
  a processor in communication with the memory, the processor being configured to control:
    (1) a first processing unit configured to acquire a signal output by the imaging element and to output a first image signal for a focus detection and a second image signal for the focus detection and an image generation;
    (2) a second processing unit configured to acquire the second image signal from the first processing unit so as to perform development processing;
    (3) a calculation unit configured to acquire the first image signal and the second image signal from the first processing unit so as to perform phase difference detection-type focus detecting calculation by correlation calculation between the first image signal and a third image signal generated from the first image signal and the second image signal; and
    (4) a control unit configured to acquire data indicating the result of the correlation calculation so as to calculate a defocus amount and control the drive unit so as to perform focus adjustment,
  wherein an output of the data indicating the result of the correlation calculation from the calculation unit to the control unit is intermittently performed at a frequency set for a plurality of image frames in accordance with an output of the second image signal from the first processing unit to the second processing unit.

15. An imaging apparatus comprising:
  an imaging element that includes pixel portions each having a plurality of photoelectric conversion units;
  a drive unit configured to drive a focus adjusting lens;
  a memory; and
  a processor in communication with the memory, the processor being configured to control:
    (1) a first processing unit configured to acquire a signal output by the imaging element and to output a first image signal for a focus detection and a second image signal for the focus detection and an image generation;
    (2) a second processing unit configured to acquire the second image signal from the first processing unit so as to perform development processing;
    (3) a calculation unit configured to acquire the first image signal and the second image signal from the first processing unit so as to perform phase difference detection-type focus detecting calculation by correlation calculation between the first image signal and a third image signal generated from the first image signal and the second image signal; and
    (4) a control unit configured to acquire data indicating the result of the correlation calculation so as to calculate a defocus amount and to control the drive unit so as to perform focus adjustment,
  wherein an output of the data indicating the result of the correlation calculation from the calculation unit to the control unit (a) is performed at a rate of once for a plurality of image frames in a first mode and (b) is performed-at a frequency more than that in the first mode in a second mode, in accordance with an output of the second image signal from the first processing unit to the second processing unit.

16. The imaging apparatus according to claim 14, wherein the calculation unit comprises a data output unit configured to output the data indicating the result of the correlation calculation, and
  wherein the control unit stops the operation of the data output unit in a frame period during which the focus detecting calculation is not performed.

17. The imaging apparatus according to claim 15, wherein the calculation unit comprises a data output unit configured to output the data indicating the result of the correlation calculation, and
  wherein the control unit stops the operation of the data output unit in a frame period during which the focus detecting calculation is not performed.

18. The imaging apparatus according to claim 14, wherein the calculation unit comprises a correlation calculation processing unit configured to perform correlation calculation between the first image signal and the third image signal, and
  wherein the control unit stops processing performed by the correlation calculation processing unit in a frame period during which the focus detecting calculation is not performed.

19. The imaging apparatus according to claim 15, further comprising:
  an operation unit configured to provide still image capturing instructions,
  wherein, when the control unit receives still image capturing instructions from the operation unit, the control unit controls to change an operation mode to the second mode.

20. The imaging apparatus according to claim 19, wherein the calculation unit comprises a data output unit configured to output the data indicating the result of the correlation calculation and a correlation calculation processing unit configured to perform correlation calculation between the first image signal and the third image signal, and wherein the control unit controls to start the operation of the data output unit immediately after correlation calculation by the correlation calculation processing unit in a frame period during which the focus detecting calculation is performed in the second mode, whereas the control unit controls to stop the operation of the data output unit and the processing by the correlation calculation processing unit in a frame period during which the focus detecting calculation is not performed.

21. The imaging apparatus according to claim 20, wherein, after completion of a read operation by the imaging element in the first mode, the control unit controls to start the operation of the data output unit.

22. The imaging apparatus according to claim 14, wherein the control unit changes a timing for outputting the data indicating the result of the correlation calculation depending on the position of a focus detecting area calculated by the calculation unit.

23. The imaging apparatus according to claim 14, wherein the control unit controls to stop clock supply to the calculation unit in a frame period during which the focus detecting calculation is not performed.

24. The imaging apparatus according to claim 14, wherein the control unit controls to stop output of a focus detecting signal from the imaging element in a frame period during which the focus detecting calculation is not performed.

25. A control method for execution by an imaging apparatus that comprises (a) an imaging element that includes pixel portions each having a plurality of photoelectric conversion units and (b) a drive unit configured to drive a focus adjusting lens, the control method comprising:

acquiring, by a first processing unit, a signal output by the imaging element, and outputting a first image signal for a focus detection and a second image signal for the focus detection and an image generation;

acquiring, by a second processing unit, the second image signal from the first processing unit so as to perform development processing;

acquiring, by a calculation unit, the first image signal and the second image signal from the first processing unit so as to perform phase difference detection-type focus detecting calculation by correlation calculation between the first image signal and a third image signal generated from the first image signal and the second image signal; and acquiring, by a control unit, data indicating the result of the correlation calculation so as to calculate a defocus amount and controlling the drive unit so as to perform focus adjustment, wherein, in the calculation unit, an output of the data indicating the result of the correlation calculation from the calculation unit to the control unit is intermittently performed at a frequency set for a plurality of image frames in accordance with an output of the second image signal from the first processing unit to the second processing unit.

26. A control method for execution by an imaging apparatus that comprises (a) an imaging element that includes pixel portions each having a plurality of photoelectric conversion units and (b) a drive unit configured to drive a focus adjusting lens, the control method comprising:

acquiring, by a first processing unit, a signal output by the imaging element and outputting a first image signal for a focus detection and a second image signal for the focus detection and an image generation;

acquiring, by a second processing unit, the second image signal from the first processing unit so as to perform development processing;

acquiring, by a calculation unit, the first image signal and the second image signal from the first processing unit so as to perform phase difference detection-type focus detecting calculation by correlation calculation between the first image signal and a third image signal generated from the first image signal and the second image signal; and acquiring, by a control unit, data indicating the result of the correlation calculation so as to calculate a defocus amount and controlling the drive unit so as to perform focus adjustment, wherein, in the calculation unit, an output of the data indicating the result of the correlation calculation from the calculation unit to the control unit (a) is performed at a rate of once in a plurality of image frames in a first mode and (b) is performed at a frequency more than that in the first mode in a second mode, in accordance with an output of the second image signal from the first processing unit to the second processing unit.

* * * * *